(No Model.)
P. O. KEILHOLTZ.
MECHANISM FOR LOCATING AND DETERMINING DEFECTS IN RAIL BONDING.
No. 574,333. Patented Dec. 29, 1896.
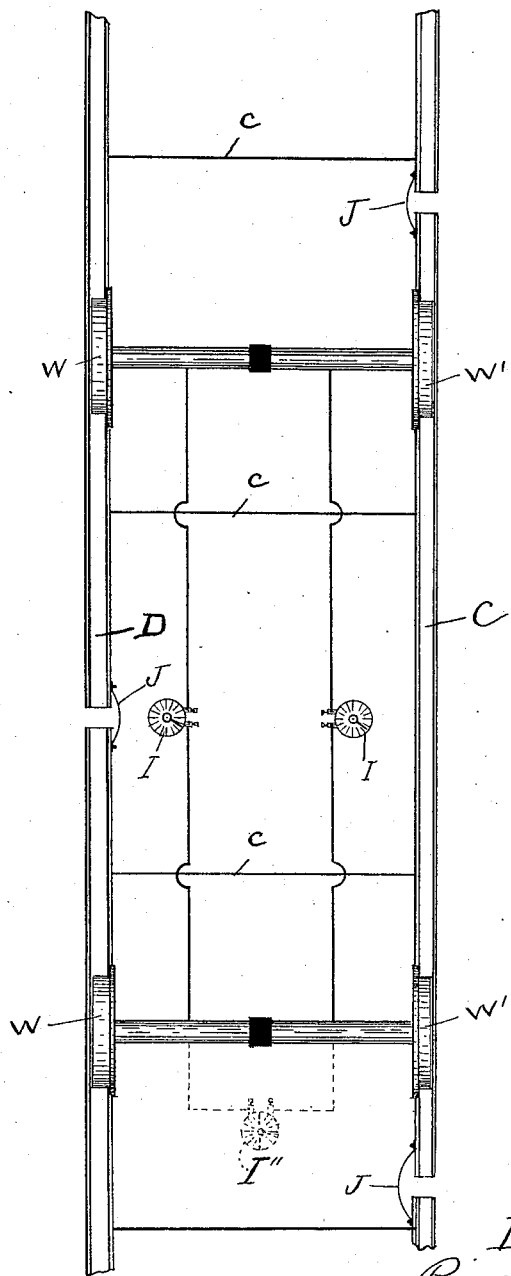

UNITED STATES PATENT OFFICE.

PIERRE O. KEILHOLTZ, OF BALTIMORE, MARYLAND, ASSIGNOR OF ONE-HALF TO JAMES F. HEYWARD, OF SAME PLACE.

MECHANISM FOR LOCATING AND DETERMINING DEFECTS IN RAIL-BONDING.

SPECIFICATION forming part of Letters Patent No. 574,333, dated December 29, 1896.

Application filed February 29, 1896. Serial No. 581,294. (No model.)

*To all whom it may concern:*

Be it known that I, PIERRE O. KEILHOLTZ, a citizen of the United States, residing at Baltimore, in the State of Maryland, have invented certain new and useful Improvements in Mechanism for Locating and Determining Defects in Rail-Bonding; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to means and mechanism for locating and determining defects in rail-bonding under actual working conditions, though, inasmuch as the operation of the device is based upon the laws governing variation of potential, the same or similar mechanism may be employed in connection with any conductor or system of conductors for the same purposes.

It is well known that in the vast majority of electric railways, and particularly in those employing the overhead contact, the rails form the return-conductor, and to preserve the continuity of this return-circuit various devices have been proposed and have been used to reduce the resistance at the rail-joints. The means commonly employed is to connect the adjacent ends of the rails through the medium of wires or straps of high conductivity in intimate contact with the said rails. Instead of this particular method of joining the rails cross-bonds are often employed either alone or in connection with those above mentioned, in the former instance the circuit being zigzag from one rail to that opposite, said opposite section being arranged openly.

In suburban lines where the rails are wholly above the surface of the earth it is a very simple matter to inspect the bonds and their connections, and thus detect any defects, but in urban lines where the surface of the road or street covers up all but the tread of the rail it is impracticable to inspect the bonds, as this necessitates the removal of the paving, the bonds being hid thereby.

It is obvious that in order to operate a system of this nature economically all conductors must be in good working order, but to determine and locate a fault in the conductor is an exceedingly difficult problem, to overcome which defects is the object of this invention.

A current of electricity flowing along a conductor having a difference of potential at two points on the conductor equal to the amount of the current times the resistance of the conductor, if said two points are located one on either side of a rail-joint, a difference of potential will be found to exist between those two points depending upon the resistance of the joint multiplied by the quantity of current flowing therethrough. If it is found that this difference of potential is above normal, it is evident that the said joint or bond is faulty either in itself or in its connection with the rails. As a standard of normal resistance a length of rail equal to that of the bond, or approximately, is taken and the difference in potential at its extremities is determined. This latter determination should be performed simultaneously with the former in order that the working conditions may be practically identical.

Referring now to the drawing, in which I have shown a diagrammatic view of a return-circuit of an electric railway equipped with my invention, C and D are a right and left hand rail, respectively, of a road, the sections of said rails being laid with the extremity of one overlapping those of the opposite sections, as is usual in such constructions.

The extremities of the rail-sections are electrically united by joint-bonds J, while in order to illustrate the adaptability of my mechanism for use with cross-bonding I have shown a series of such bonds c arranged in the usual manner, as above described.

My invention consists of four normally mutually-insulated points so arranged that two of them will move in rubbing or sliding contact with each rail, along which they are adapted to be simultaneously moved, and for this purpose are rigidly secured to, but insulated from, a common support.

Each pair of contacts adapted to engage a rail are electrically connected through either a recording or direct-reading instrument I and I' for measuring the difference of potential between said points.

With this construction it will be noted that as it is drawn or otherwise moved along the road the contact-points W will be in engagement with a continuous section of a rail, whereas the corresponding points W' will be separated by or will lie on opposite sides of a bond J. Therefore between two points of the same rail or two points adjacent to a rail-joint a difference of potential will exist depending upon the resistance of the rail or joint times the quantity of current flowing along the rail, and if this difference of potential be measured simultaneously between two points equidistant on the rail and adjacent to the joint the respective resistances of the rail and the joint will vary directly as the differences measured, and if such inequality is above a predetermined amount the rail may be marked at this point either automatically or by hand, or, if desired, the location of said defect may be recorded by suitable instruments. In the drawing I have shown the frame and contact-points as a truck and wheels, respectively.

In order to determine the difference of potential at the extremities of the cross-bonds $c$, I connect a point W and W' through a recording instrument I", the operation of which is similar to that just described, suitable switches being employed to cut out the instruments not in use.

Instead of employing three instruments shown it is evident that I may use but one instrument for indicating or recording the potential and may use any connection therewith.

Having thus described my invention, what I claim is—

1. A device of the class described comprising a series of contacts connected in pairs through potential indicating or recording instruments and electrical conductors, each pair of contacts being arranged to make sliding or rubbing contact at simultaneously-corresponding points of a separate conductor.

2. A device of the class described comprising a series of contacts connected in pairs through the medium of potential indicating or recording instruments and electrical conductors, said pairs being adapted to conduct an electric current in parallel, each pair of contacts being arranged to make sliding or rubbing contact at simultaneously-corresponding points on a separate conductor.

3. A device of the class described comprising a series of contacts connected in pairs and adapted to make contact with electrical conductors, and means for comparing the difference of potentials between each pair under working conditions, each pair of contacts being arranged to make sliding or rubbing contact at simultaneously-corresponding points on a separate conductor.

4. A device of the class described comprising a series of contacts arranged in pairs, and adapted to make contact with electrical conductors, and means for determining the difference of potential in said conductors between said pairs, said pairs being arranged in parallel, each pair of contacts being arranged to make sliding or rubbing contact at simultaneously-corresponding points on a separate conductor.

5. A device of the class described comprising a series of contacts connected in pairs to make connection with electrical conductors along which they are adapted to be moved, means for showing the difference in potential between the points of contact of each pair, and means for determining the movement of the contacts, each pair of contacts being arranged to make sliding or rubbing contact at simultaneously-corresponding points on a separate conductor.

6. A device of the class described comprising a framework provided with wheels arranged in pairs adapted to bear upon the rails of a railway, the wheels of each pair being insulated from each other, and galvanometers connected with each pair of a line of wheels.

7. A device of the class described comprising a framework provided with moving contact-points arranged in pairs and adapted to engage the rails of a railway, the points of each pair being insulated from each other and galvanometers connected with each pair of alined points.

In testimony whereof I affix my signature in presence of two witnesses.

PIERRE O. KEILHOLTZ.

Witnesses:
HARRY M. GRAFTON,
GEORGE W. HATCH.